United States Patent
Mammoser et al.

(10) Patent No.: US 9,716,537 B2
(45) Date of Patent: Jul. 25, 2017

(54) AUTOMATIC ANTENNA SECTOR-LEVEL SWEEP IN AN IEEE 802.11AD SYSTEM

(71) Applicant: Nitero Pty Ltd., Fitzroy, Victoria (AU)

(72) Inventors: Douglas A. Mammoser, Austin, TX (US); Richard Steven Richmond, II, Austin, TX (US); Sebastian Ahmed, Austin, TX (US)

(73) Assignee: NITERO PTY LTD, Fitzroy, Victoria (AU)

( * ) Notice: Subject to any disclaimer, the term of this patent is extended or adjusted under 35 U.S.C. 154(b) by 0 days.

(21) Appl. No.: 14/694,734

(22) Filed: Apr. 23, 2015

(65) Prior Publication Data
US 2016/0315676 A1 Oct. 27, 2016

(51) Int. Cl.
*H04B 7/04* (2006.01)
*H04B 7/0456* (2017.01)
*H01Q 3/24* (2006.01)
*H04B 7/06* (2006.01)

(52) U.S. Cl.
CPC ............ *H04B 7/0456* (2013.01); *H01Q 3/24* (2013.01); *H04B 7/0608* (2013.01)

(58) Field of Classification Search
CPC .......... H04W 28/044; H04W 72/1226; H04W 56/00; H04B 7/0602; H04B 7/0691
See application file for complete search history.

(56) References Cited

U.S. PATENT DOCUMENTS

| | | | | |
|---|---|---|---|---|
| 8,942,201 B1* | 1/2015 | Duvvuri | ............ | H04W 28/044 370/314 |
| 2007/0275671 A1* | 11/2007 | Hwang | ................ | H04B 1/1615 455/73 |
| 2012/0224568 A1* | 9/2012 | Freda | ................ | H04W 56/0015 370/338 |
| 2012/0269080 A1* | 10/2012 | Giustiniano | .......... | H04W 64/00 370/252 |
| 2012/0309325 A1* | 12/2012 | Carbone | .................. | H04B 1/40 455/73 |
| 2014/0185551 A1* | 7/2014 | Sanderovich | ......... | H04L 1/0033 370/329 |
| 2015/0163828 A1* | 6/2015 | Vandwalle | .......... | H04W 28/044 370/330 |

* cited by examiner

*Primary Examiner* — Aristocratis Fotakis
(74) *Attorney, Agent, or Firm* — Hickman Palermo Becker Bingham LLP; Edward A. Becker

(57) ABSTRACT

Techniques for performing automatic antenna sector-level sweep switching are described herein. According to an embodiment, an apparatus comprises a lookup table for storing a set of antenna configuration entries and a sector-level sweep (SLS) controller implemented in hardware that is communicatively coupled to the lookup table. The SLS sweep controller is operative to read an antenna configuration entry from the set of antenna configuration entries stored in the lookup table and output control signals to configure a set of one or more antennas based on the antenna configuration entry. The SLS controller is further operative to switch between different antenna configuration entries in the set of antenna configuration entries stored in the lookup table in response to a signal from a timing source thereby periodically changing the configuration of the set of one or more antennas.

21 Claims, 5 Drawing Sheets

AUTOMATIC ANTENNA SECTOR-LEVEL SWEEP IN AN IEEE 802.11AD SYSTEM

FIELD OF THE DISCLOSURE

The present disclosure generally relates to antenna configurations and, more specifically, to techniques for performing automatic antenna sector-level sweeps for wireless communications systems operating in extremely high frequency bands.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The availability of unlicensed millimeter-wave (mm-wave) radio frequency (RF) bands is spurring the development of main stream applications that use mm-wave wireless technologies. For example, the Institute of Electrical and Electronics Engineers (IEEE) 802.11ad standard, also known as WiGig, promises up to approximately 7 Gigabits per second data rate over the 60 GHz frequency band for consumer applications such as wireless transmission of high-definition video.

Wireless communication devices that operate within extremely high frequency (EHF) bands, such as the 60 GHz frequency band, are able to transmit and receive signals using relatively small antennas. However, such signals are subject to high atmospheric attenuation when compared to transmissions over lower frequency bands. In order to reduce the impact of such attenuation and boost communication range, EHF devices typically incorporate beamforming technology. For example, the IEEE 802.11ad specification details a procedure, referred to as sector-level sweep (SLS), during which a wireless station tests and negotiates the best transmit and/or receive antenna combinations with a remote station. In both a transmit sector sweep (TXSS) and a receive sector sweep (RXSS), the wireless station must switch its antenna configuration multiple times at known timing boundaries, where the switching occurs during test frame transmission for a TXSS and during test frame reception for an RXSS. The goal of the SLS phase is to identify and select an antenna configuration that allows the wireless stations to communicate at a threshold physical layer (PHY) rate.

The timing between antenna configuration switches during an SLS, as described in the IEEE 802.11ad specification, can be as short as 1 microsecond (us). Compounding the problem, beamforming during an RXSS requires the two negotiating stations to be synchronized in time such that the receiver station switches the antenna configuration right before the transmitter station starts sending a beamforming (BF) frame. Synchronization between the two peer stations is generally achieved using a timing synchronization function (TSF), where each station maintains a local TSF timer. Due to the TSF accuracy tolerance, however, the two stations' timers may vary by as much as 1 us. With a TSF accuracy of 1 us and a minimum inter-frame spacing of 1 us, timing antenna configuration changes during an SLS such that they occur at the proper times may be difficult.

BRIEF DESCRIPTION OF THE DRAWINGS

Embodiments are depicted by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. Overview

Techniques for performing automatic antenna sector-level sweep switching are described herein. According to an embodiment, an apparatus comprises a lookup table for storing a set of antenna configuration entries and a sector-level sweep (SLS) controller implemented in hardware that is communicatively coupled to the lookup table (LUT). The SLS controller is operative to read an antenna configuration entry from the set of antenna configuration entries stored in the lookup table and output control signals to configure a set of one or more antennas based on the read antenna configuration entry. The SLS controller is further operative to switch between different antenna configuration entries in the set of antenna configuration entries stored in the lookup table in response a set of one or more signals, including a signal from a timing source, and to periodically change the configuration of the set of one or more antennas.

In another embodiment, the apparatus may adjust a timing source for triggering antenna configurations changes based on whether the SLS operation is a TXSS or an RXSS. For both the TXSS and RXSS operations, the apparatus maintains a local TSF timer that is synchronized with one or more TSF timers on remote devices. Based on the local TSF timer, the apparatus may determine designated switch times for changing antenna configurations during an SLS operation. For a TXSS operation, the apparatus may change antenna configurations at the designated switch times without making any adjustments to account for potential differences between the local TSF and the remote TSF on the receiving station. For an RXSS operation, however, the apparatus adjusts timing source to account for the potential differences between the local TSF and the remote TSF of the transmitting device. Specifically, the apparatus may change the antenna configuration before the designated switch time if a clear channel assessment indicates that a channel over which the apparatus and the transmitting device are communicating is clear. This approach tolerates time differences between TSF timers such that the TSF timers do not need to be perfectly synchronized.

II. Architectural Overview

Figure 1:
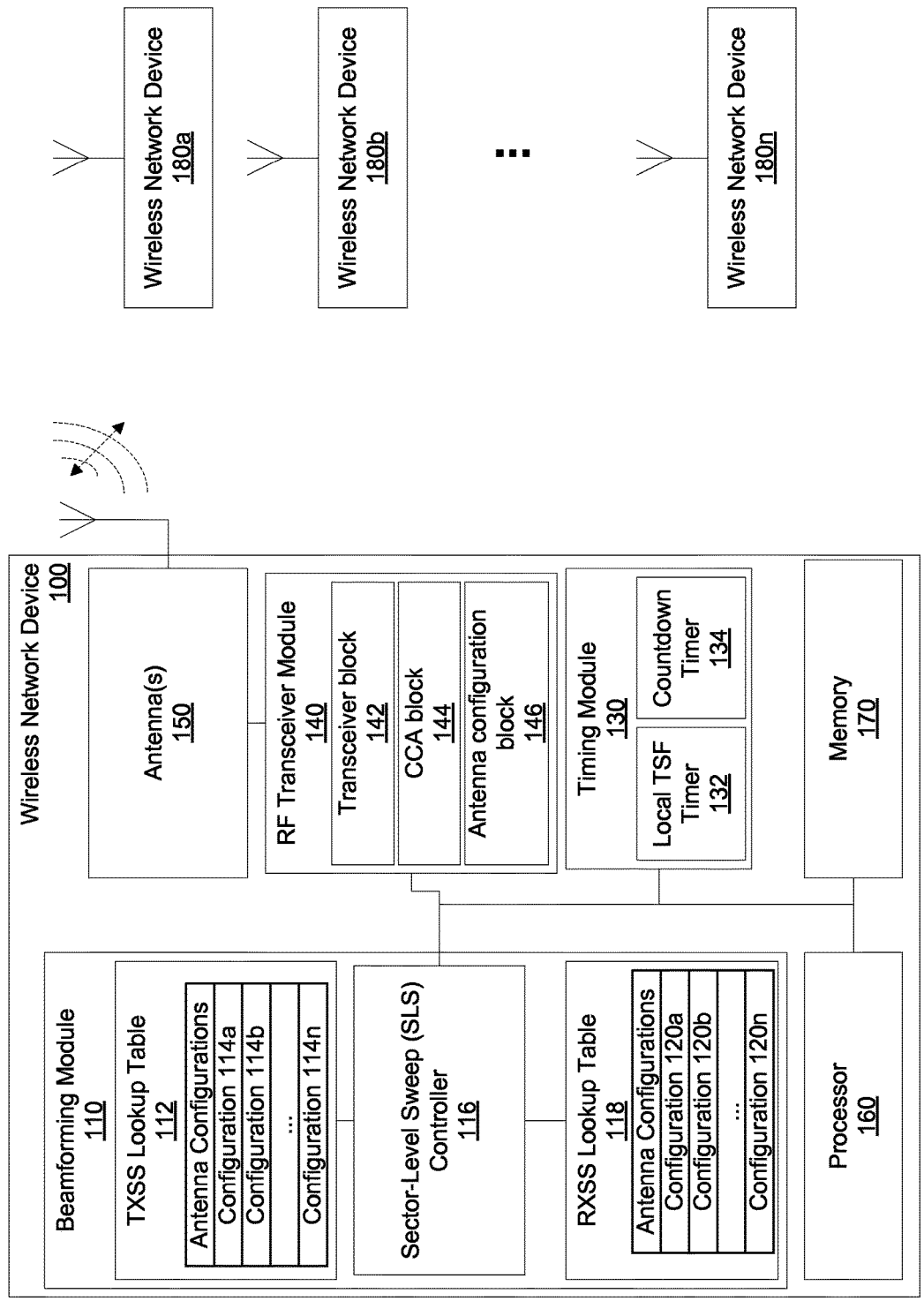
FIG. 1 is a block diagram depicting an example wireless communication arrangement in which embodiments may be implemented.

FIG. 1 is a block diagram depicting an example wireless communication arrangement in which embodiments may be implemented. The arrangement includes wireless network device 100, which is configured to wirelessly communicate with one or more of wireless network devices 180a, 180b, and 180n by propagating radio waves through the atmosphere and/or free space. Wireless network device 100 generally comprises beamforming module 110, timing module 130, RF transceiver module 140, antenna(s) 150, processor 160, and memory 170. Examples implementations of wireless network devices 100, 180a, 180b, and 180n may include, without limitation, smartphones, tablet computing devices, laptop computers, personal digital assistants, smart television sets, routers, IEEE 802.11 stations, etc.

Beamforming module 110 includes hardware blocks and circuitry for controlling sector-level sweeps when wireless network device 100 is communicating with one or more of wireless network devices 180a to 180n. The hardware blocks include transmit sector sweep lookup table (TXSS-LUT) 112, SLS controller 116, and receive sector sweep lookup table (RXSS-LUT) 118. These blocks may generally comprise circuitry for performing transmit and receive SLS operations completely in hardware, such as described in further detail below. The manner in which the hardware blocks of beamforming module 110 are implemented may vary depending on the particular design. For example, the hardware blocks/circuit logic may be implemented in an integrated circuit, such as an application specific integrated circuit (ASIC), a system on chip (SoC), and/or a radio frequency integrated circuit (RFIC), or may be programmed into a field programmable gate area (FPGA). By pushing such functions to hardware, antenna configuration changes and successive BF frames may be processed (e.g., transmitted/received) without interacting with firmware or other software executing on processor 160. The specialized hardware allows processor 160 to be free for other tasks and eliminates any delay that may be caused by communicating with processor 160. By reducing or eliminating such delay, the specialized hardware allows for slower and less costly processors to be used within wireless network device 100 without compromising the timing requirements of the IEEE 802.11ad specification, where the intervals between BF frames may be as short as 1 us.

TXSS-LUT 112 stores a plurality of antenna configuration entries, including configurations 114a, 114b, and 114n, which are used during a TXSS operation. RXSS-LUT 118 also stores a plurality of antenna configuration entries, including configurations 120a, 120b, and 120n, which are used during an RXSS operation. An "antenna configuration entry" in this context refers to an entry within a lookup table that corresponds to a particular configuration of antenna(s) 150. As an example, an antenna configuration entry may store an antenna weighted vector (AWV) that describes the excitation (amplitude and phase) for each element of an antenna array. In another example, the antenna configuration entry may store a sector identifier or other value used to select an AWV that is stored in an RFIC, such as RF transceiver module 140. If RF transceiver module 140 stores $2^n$ different AWVs, for instance, then each configuration entry may be an n-bit value, where n is a positive integer.

In one embodiment, TXSS-LUT 112 and RXSS-LUT 118 are implemented as software-programmable, hardware lookup tables (LUTs). Firmware or other software executing on processor 160 may thus be used to set the values of configuration entries 114a to 114n and 120a to 120n. System software may thus configure the lookup tables based on the number of expected antenna configurations and based on whether the entries are for a TXSS or an RXSS operation. TXSS-LUT 112 and RXSS-LUT 118 may be part of the same hardware LUT or may comprise physically separate hardware LUTs, depending on the particular implementation. When part of the same hardware LUT, for example, memory within the LUT may be partitioned, with a first set of addresses storing configuration entries for a TXSS operation and a second set of addresses storing configuration entries for an RXSS operation. The same input lines and multiplexor (or set of multiplexors) may be used to select between antenna configuration entries. When different hardware LUTs are used, different input lines and multiplexors may be used for each LUT. In alternative arrangements, additional LUTs may be used and/or one of the LUTs may be omitted.

SLS controller 116 comprises circuitry that reads an entry from one of TXSS-LUT 112 or RXSS-LUT 118 in response to a set of one or more input signals and outputs corresponding control signals to configure antenna(s) 150. As an example, SLS controller 116 may comprise a plurality of input and output lines that are communicatively coupled with other hardware blocks within wireless network device, such as timing module 130 and RF transceiver module 140. The input lines may be configured to receive a set of one or more timing signals from timing module 130 and a set of one or more CCA signals from CCA block 144. The input lines may further be configured to receive a set of input signals that indicate when a TXSS or RXSS operation is active. The output signals may be configured to provide control signals to RF transceiver module 140 or antenna(s) 150 and may be used to either adjust the configuration of antenna(s) through RF transceiver module 140 or directly. Example control signals may include, without limitation, a configuration identifier that selects a particular configuration provided by RF transceiver module 140 or an AWV used to adjust the excitation of antenna(s) 150.

Beamforming module 110 may further comprise additional logic for selecting the directionality of the transmission and reception of radio signals for wireless network device 100, which are not depicted for purposes of brevity. For example, beamforming module 110 may optionally include beam refinement protocol (BRP) blocks for refining the antenna configuration in a beam refinement phase after the SLS phase has completed.

Timing module 130 includes logic for timing synchronization among wireless network device 100 and one or more of wireless network devices 180a, 180b, and 180n. Timing module 130 comprises local timing synchronization function (TSF) timer 132 and countdown timer 134. Local TSF timer 132 is synchronized with remote TSF timers that are part of the same basic service set (BSS). For example, wireless network device 100 may transmit and/or process beacon frames that contain timing information used to synchronize the TSF timers according to a timing synchronization function. Local TSF timer 132 counts in increments of microseconds, where each increment may be tracked by countdown timer 134.

Countdown timer 134 is programmed to output a set of one or more timing signals at predetermined timing intervals. In one embodiment, the set of timing signals includes a signal that indicates designated switch times for changing antenna configurations and/or designated start times for frame transmissions. A "designated" time in this context refers to a time that is agreed upon or otherwise predetermined such that the switching time is coordinated or otherwise synchronized between stations. In another embodiment, the set of timing signals may include a signal that is triggered at a predetermined time before the designated time. This signal may be used in the case of the RXSS operation as described further below. The set of timing signals may further be used to synchronize other events for an SLS operation, such as when to start transmission of a BF frame, when an SLS operation has ended, etc.

RF transceiver module 140 comprises transceiver block 142, clear channel assessment block 144, and antenna configuration block 146. Transceiver block 142 includes a transmitter and receiver for wirelessly transmitting and receiving signals via radio waves. In one embodiment, the transceiver is a mm-wave transceiver operable to wirelessly transmit and receive signals over one or more channels in the 60 GHz band. The millimeter sized wavelengths in the 60 GHz band allows for antenna(s) 150 to be relatively small and allow wireless network device 100 to communicate via WiGig signals.

Clear channel assessment block 144 determines whether a channel over which wireless network device 100 and one of wireless network devices 180a, 180b, and 180n are communicating is clear. Clear channel assessment block 144 may determine whether the channel is clear based on a carrier sense and/or an energy detect. For the carrier sense, clear channel assessment block 144 detects and decodes a WiGig preamble to determine a time duration for a transmission. A CCA flag is then held as busy until the end of the transmission. For the energy detect, clear channel assessment block 144 detects how much energy there is on the channel. If the energy is above a threshold level, then the CCA flag is held busy until the energy is below the threshold. The threshold value used may vary depending on the particular implementation.

Antenna configuration block 146 comprises circuitry for configuring antenna(s) 150 based on input received from SLS controller 116. Generally, the circuitry controls and adjusts the directionality of radio wave transmission and reception through antenna(s) 150. In one embodiment, antenna configuration block 146 processes AWVs that describe the phase and amplitude of each antenna within an antenna array. Antenna configuration block may store a LUT of AWVs, with SLS controller 116 selecting a particular AWV during an SLS operation, or antenna configuration block 146 may receive the AWV directly from SLS controller 116.

Antenna(s) 150 represents one or more antennas, such as a phased array, a single element antenna, a set of switched beam antennas, etc., that may be configured to change the directionality of the transmission and reception of radio signals. As an example, antenna(s) 150 may comprise one or more antenna arrays, where the amplitude of phase for each antenna within an antenna array may be configured independently of other antennas within the array. The term "sector" as used herein refers to a transmit or receive antenna pattern/configuration and may be assigned a corresponding sector identifier.

Wireless network device 100 includes hardware processor 160, which coupled to beamforming module 110, timing module 130, RF transceiver module 140, and memory 170 via a bus or some other interconnection fabric. Hardware processor 160 may be a general purpose microprocessor or a special-purpose processor, such as a media access control (MAC) processor, that fetches, decodes, and executes instructions from memory 170. In one embodiment, instructions executed by hardware processor 160 may cause antenna configurations entries to be loaded into TXSS-LUT 112 and RXSS-LUT 118. The loads may be performed a priori before an SLS operation begins. In another embodiment, the instructions may cause hardware process 160 to program countdown timer to output one or more timing signals to beamforming module 110 at predetermined timing intervals with respect to the local TSF timer 132. For example, the timing signals may be used to time antenna configuration changes as described in further detail below.

Wireless network device 100 also includes a main memory 170, which may be a random access memory (RAM) or other dynamic storage device, for storing information and instructions to be executed by processor 160. Main memory 170 also may be used for storing temporary variables or other intermediate information during execution of instructions to be executed by processor 160.

III. Transmit Sector Sweep Antenna Configuration Switching

In a TXSS operation, wireless network device 100 transmits a sequence of BF frames, switching antenna configurations in between frames. The BF frames include a set of fields that generally identify the antenna configuration used to transmit the BF frame. For example, the BF frames may include a sector identifier that identifies the transmit antenna patterns used to transmit the BF frame. The remote station receives the BF frames and determines the frame that was received with the best quality (e.g., the best PHY rate). At the end of the TXSS operation, the remote station sends a sector sweep feedback frame (SSW) to wireless network device 100 that includes the sector identifier for the frame that was received with the best quality.

In one embodiment, specialized hardware within wireless network device 100 is used to perform antenna configuration switching during a TXSS operation. The specialized hardware may be used both when wireless network device 100 is the initiator station in an initiator TXSS operation or when wireless network device 100 is the responder station in a responder TXSS (i.e., SLS is initiated by a remote station). In either scenario, the specialized hardware may automatically switch antenna configurations without communicating with or otherwise involving processor 160. As previously indicated, the specialized hardware reduces demands on the processor and allows for slower, less costly processors to be used within wireless network device 100 without compromising the strict timing requirements of inter-frame spacing during a TXSS operation. For example, short beamforming inter-frame spacing (SBIFS) provides for a 1 us turnaround time between the end of one BF frame transmission and the beginning of the next BF frame transmission. Due to communication delays and other overhead costs, processors not operating at gigahertz speeds may have trouble managing antenna configuration changes and frame transmissions within such a short timeframe. The processors may instead offload these tasks to the specialized hardware, which may be used to ensure that antenna configurations are changed at appropriate times.

Figure 2:
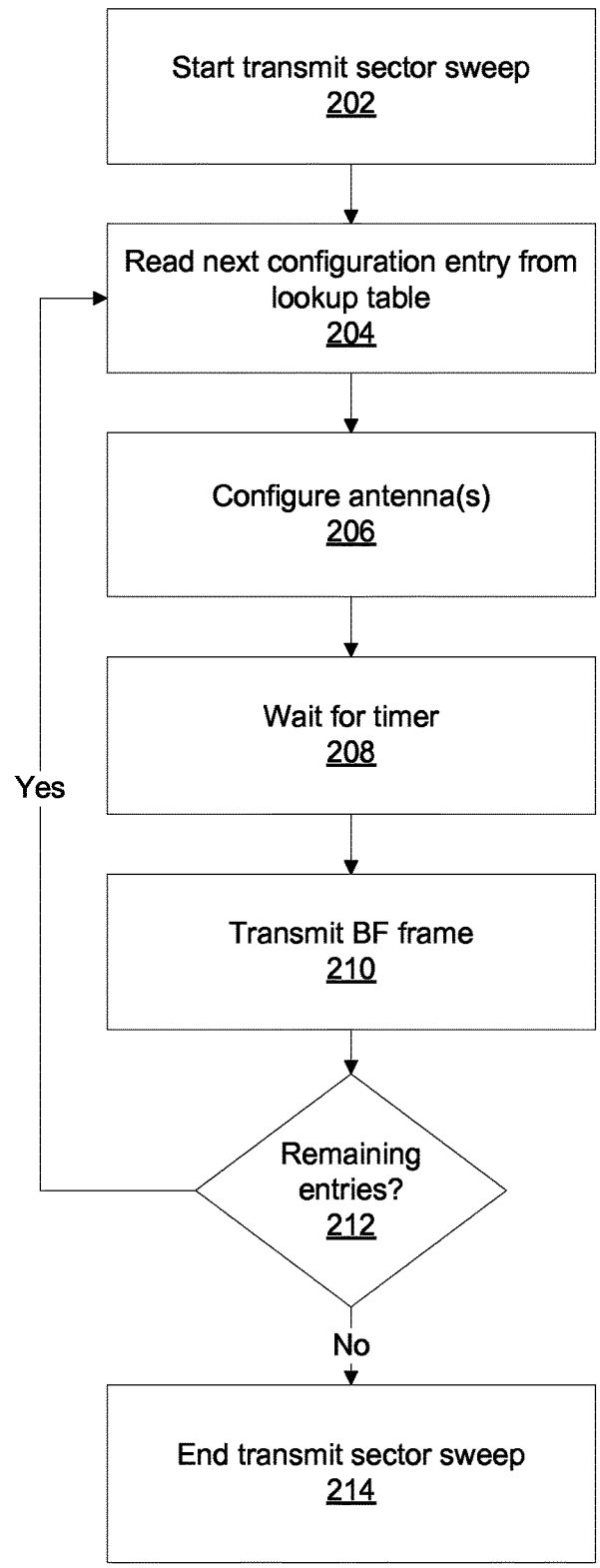
FIG. 2 is a flowchart depicting an example process for switching antenna configurations using specialized hardware during a transmit sector sweep operation.

FIG. 2 is a flowchart depicting an example process for switching antenna configurations using specialized hardware during a TXSS operation. At step 202, the transmit sector sweep operation is initiated on wireless device 100. During this step, for example, wireless network device 100 may enable the transmitter, if not already enabled. Processor 160 or some other component may signal beamforming module 110 to begin the TXSS operation thereby triggering the sequence of antenna configuration changes and corresponding frame transmissions described herein.

At step 204, SLS controller 116 reads a configuration entry from TXSS-LUT 112 in response to a set of input signals including a signal indicating that a TXSS operation is active and a signal from timing module 130 indicating a designated switch time. For the first configuration of a TXSS operation, SLS controller 116 may use a base address to perform the read. SLS controller 116 may then automatically increment the address for each subsequent read.

At step 206, SLS controller 116 outputs control signals to configure antenna(s) 150 based on the corresponding configuration entry that was read from TXSS-LUT 112. For example, SLS controller 116 may output a sector identifier or an AWV to RF transceiver module 140. In response to receiving the control signals, RF transceiver module 140 may adjust the excitation (i.e., the phase and/or amplitude) of one or more antennas. In one embodiment, the timing signal is generated such that the configuration of antenna(s) 150 is changed during an inter-frame space and before a next frame for the TXSS operation is transmitted.

At step 208, RF transceiver module 140 waits for a timing signal that indicates when the next frame of the TXSS operation should be transmitted. Timing module 130 may output this timing signal at the end of an inter-frame space.

At step 210, wireless network device 100 transmits a BF frame to a remote station. Example BF frames transmitted at this step may include a digital multi-gigabit (DMG) beacon frame or a sector sweep frame (SSW). These frames identify the antenna configuration used to transmit the frame. In order to identify the configuration, the frames generally include a sector identifier that identifiers a transmit sector through which the frame is transmitted and a DMG antenna identifier that identifies the DMG antenna used to transmit the frame.

At step 212, beamforming module 110 determines whether there are any remaining entries in TXSS-LUT 112. If so, then SLS controller reads the next entry from TXSS-LUT 112, and the process repeats for the new configuration entry, thereby causing wireless network device 100 to incrementally switch to a new antenna configuration before the next frame of the TXSS is transmitted.

If there are no remaining antenna configuration entries in TXSS-LUT 112, then the TXSS operation ends at step 214. At the end of the TXSS operation, wireless network device 100 may receive an SSW feedback frame from the remote station, and select an antenna configuration based on the SSW feedback frame. For example, wireless network device 100 may select the transmit sector and DMG antenna identified in the SSW feedback frame. Thus, the configuration resulting in the best quality when compared with the other configuration entries tried from TXSS-LUT 112 may be selected. After completion of the TXSS, the remote station may perform its own TXSS, an RXSS may be performed, or the SLS phase may end.

IV. Receive Sector-Level Sweep Switching

In an RXSS operation, wireless network device 100 receives a sequence of BF frames, switching antenna configurations in between frames. As opposed to the TXSS, each BF frame of an RXSS is transmitted with the same fixed antenna sector or pattern. This is due to the fact that the remote station is transmitting the BF frames using a static configuration (i.e., the configuration on the remote station is not changing) while the receiving station, which in the present example is wireless network device 100, is changing configurations in between received BF frames. At the end of the RXSS operation, wireless network device 100 may select the antenna configuration that results in the best quality (e.g., the best PHY rate) for receiving transmissions from the remote station.

In one embodiment, specialized hardware within wireless network device 100 is used to perform antenna configuration switching during an RXSS operation. The specialized hardware may be used both when wireless network device 100 is the initiator station in an initiator RXSS operation and when wireless network device 100 is the responder station in a responder RXSS (i.e., SLS is initiated by a remote station). In either scenario, the specialized hardware may automatically switch antenna configurations without communicating with or otherwise involving processor 160. The specialized hardware thus reduces demands on the processor during the RXSS operation just as it does for the TXSS operation as indicated above.

Figure 3:
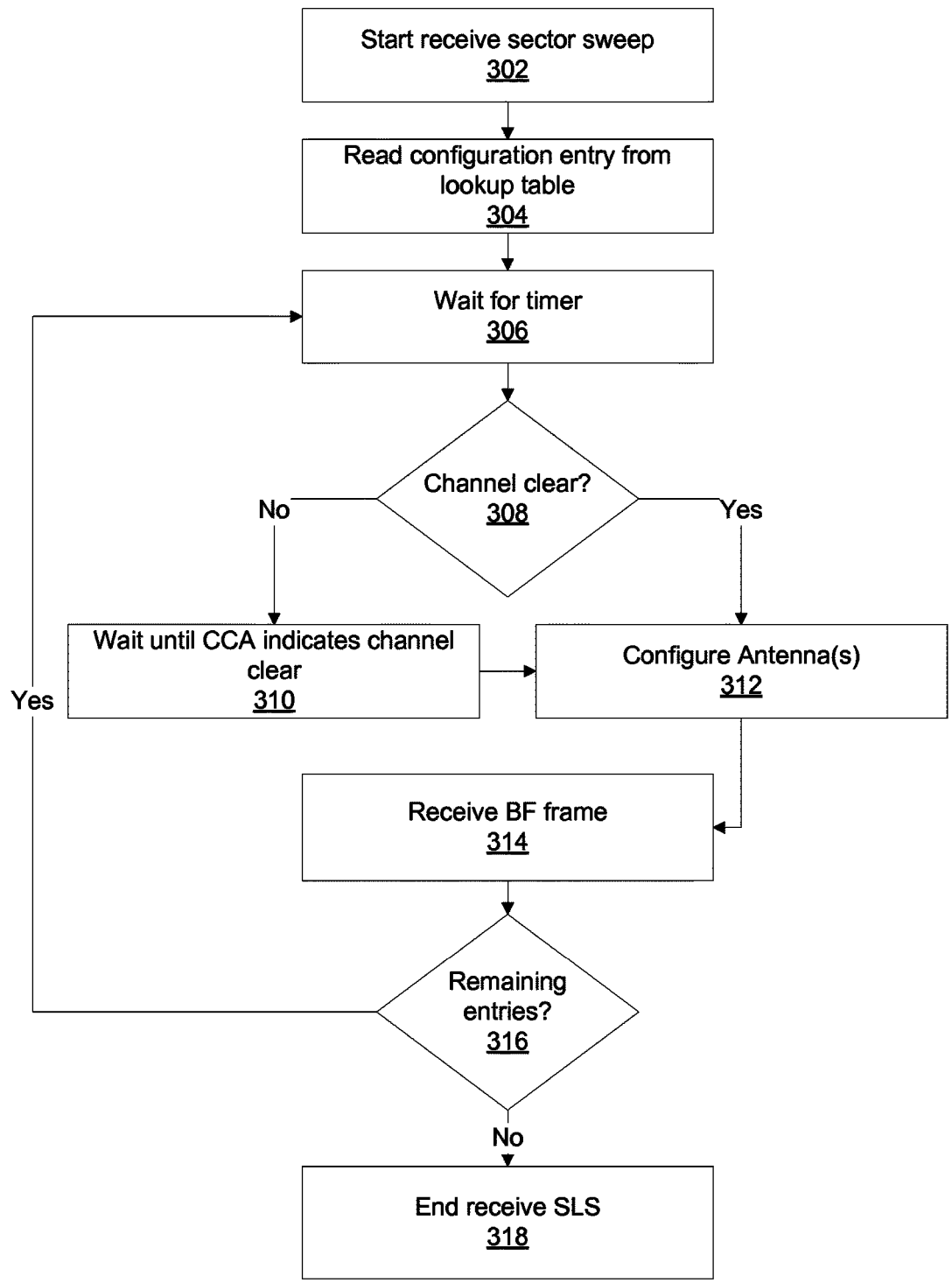
FIG. 3 is a flowchart depicting an example process for switching antenna configurations using specialized hardware during a receive sector sweep operation.

FIG. 3 is a flowchart depicting an example process for switching antenna configurations using specialized hardware during an RXSS operation. At step 302, the RXSS operation is initiated on wireless network device 100. During this step, for example, processor 160 or some other component may signal beamforming module 110 to begin the RXSS operation thereby triggering the sequence of antenna configuration changes in between receiving BF frame as described herein.

At step 304, SLS controller 116 reads a configuration entry from RXSS-LUT 118 in response to a set of input signals including a signal indicating that an RXSS operation is active. When reading the first configuration of an RXSS operation at this step, SLS controller 116 may use a base address to perform the read. SLS controller 116 may then automatically increment the address for each subsequent read from RXSS-LUT 118.

At step 306, SLS controller 116 waits for a signal from timing module 130 indicating the start of a period during which an antenna configuration change may occur. In contrast to the TXSS operation above, the signal at this step is received at a predetermined time before the designated switch times. Instead of trying to perfectly synchronize local TSF timer 132 to be perfectly synchronized with the transmitting station's TSF timer, this approach tolerates a threshold time difference by utilizing a periodic timer (e.g., countdown timer 134) that expires at a predetermined time earlier than the agreed antenna switch times and by incorporating the CCA detection into the synchronization scheme. The predetermined time may vary from implementation to implementation. In one embodiment, the predetermined time is 1 us, which allows a tolerance of up to 1 us. This value is chosen due to match SBIFS and trigger antenna configuration changes to occur during SBIFS as long as the variance in the synchronized TSF timers is not greater than 1 us.

At step 308, SLS controller 116 determines whether a channel over which the wireless network device 100 is receiving BF frames from the transmitting station is clear. In one embodiment, SLS controller 116 receives, as input from clear channel assessment block 144, a CCA flag that indicates whether the channel is busy or not. For example, clear channel assessment block 144 detects how much energy there is on the channel. If the energy is above a threshold level, then the CCA flag is held busy until the energy is below the threshold. As another example, the CCA flag may be held as busy until the expected time duration of a transmission has been reached. Clear channel assessment block 144 may determine this information by decoding WiGig preambles.

If the channel is not clear, then at step 310, SLS controller 116 waits until the CCA indicates that the channel is clear. A change in the CCA value received by SLS controller 116 triggers SLS controller 116 to proceed with configuring the antennas at step 312. If the channel was already clear at step 308, then SLS controller 116 may proceed to step 312 without waiting for the CCA value to change.

At step 312, SLS controller 116 outputs control signals to configure antenna(s) 150 based on the corresponding configuration entry that was read from RXSS-LUT 118. For example, SLS controller 116 may output a sector identifier or an AWV to RF transceiver module 140. In response to receiving the control signals, RF transceiver module 140 may adjust the excitation (i.e., the phase and/or amplitude) of one or more antennas. In one embodiment, the configuration change may occur up to 1 us before the designated switch time, which is equal to SBIFS.

At step 314, RF transceiver module 140 receives a BF frame from the remote station. Transceiver module 140 may determine the PHY rate associated with the particular configuration and compare the performance with other received frames.

At step 316, beamforming module 110 determines whether there are any remaining entries in RXSS-LUT 118. If so, then SLS controller 116 reads the next entry from RXSS-LUT 118, and the process repeats for the next configuration entry, thereby causing wireless network device 100 to incrementally switch to a new antenna configuration before the next frame of the RXSS is received.

If there are no remaining antenna configuration entries in RXSS-LUT 118, then the RXSS operation ends at step 318. At the end of the RXSS operation, wireless network device 100 may select an antenna configuration based on which configuration resulted in the best quality reception. For example, wireless network device 100 may select the receive sector or pattern that resulted in the highest overall PHY rate.

V. Timing Diagrams

As previously indicated, timing module 130 may adjust the timing signal for switching antenna configurations based on whether the SLS operation is a TXSS or an RXSS. For a TXSS operation, timing module 130 outputs a timing signal to SLS controller 116 at the standard, agreed upon switch times, because slight timing differences between local TSF timer 132 and the TSF at the remote station generally do not affect synchronization of BF frame transmissions with antenna configuration changes since wireless network device 100 is responsible for performing both. For an RXSS operation, however, wireless network device 100 is responsible for switching antenna configurations but does not transmit the BF frames. Therefore, this may result in corrupted frames if the local and remote TSF timers are not properly synchronized such that the antenna configuration changes occur between frames.

Figure 4:
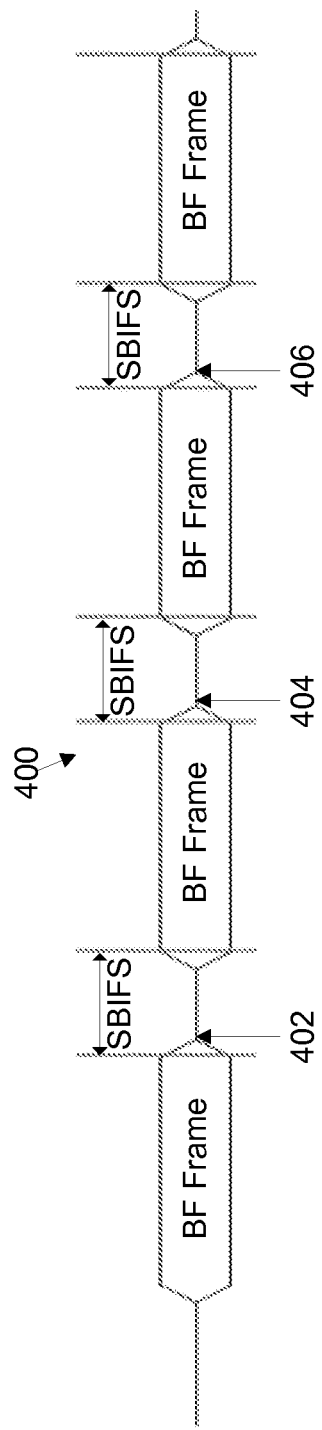
FIG. 4 is a timing diagram depicting example switch times for antenna configuration changes during a transmit sector sweep operation.

FIG. 4 is a timing diagram depicting example antenna configuration switches during a TXSS operation. Specifically, timing diagram 400 depicts a sequence of BF frames transmitted by wireless device 100 separated by SBIFS. Thus, there is a 1 us space between the end of one BF frame transmission and the start of the next BF frame transmission. Times 402, 404, and 406 indicate designated switch times for switching antenna configurations. The first BF frame is transmitted by wireless network device 100 using a first antenna configuration (e.g., configuration entry 114a). At time 402, the antenna configuration is changed according to the techniques described above. For instance, SLS controller 116 may switch from configuration entry 114a to configuration entry 114b and output control signals to configure antenna(s) 150 accordingly. The next BF frame is then transmitted using the updated antenna configuration. This process continues, with the antenna configuration periodically changing at times 404 and 406 in between different BF frames until the TXSS operation ends.

Figure 5:
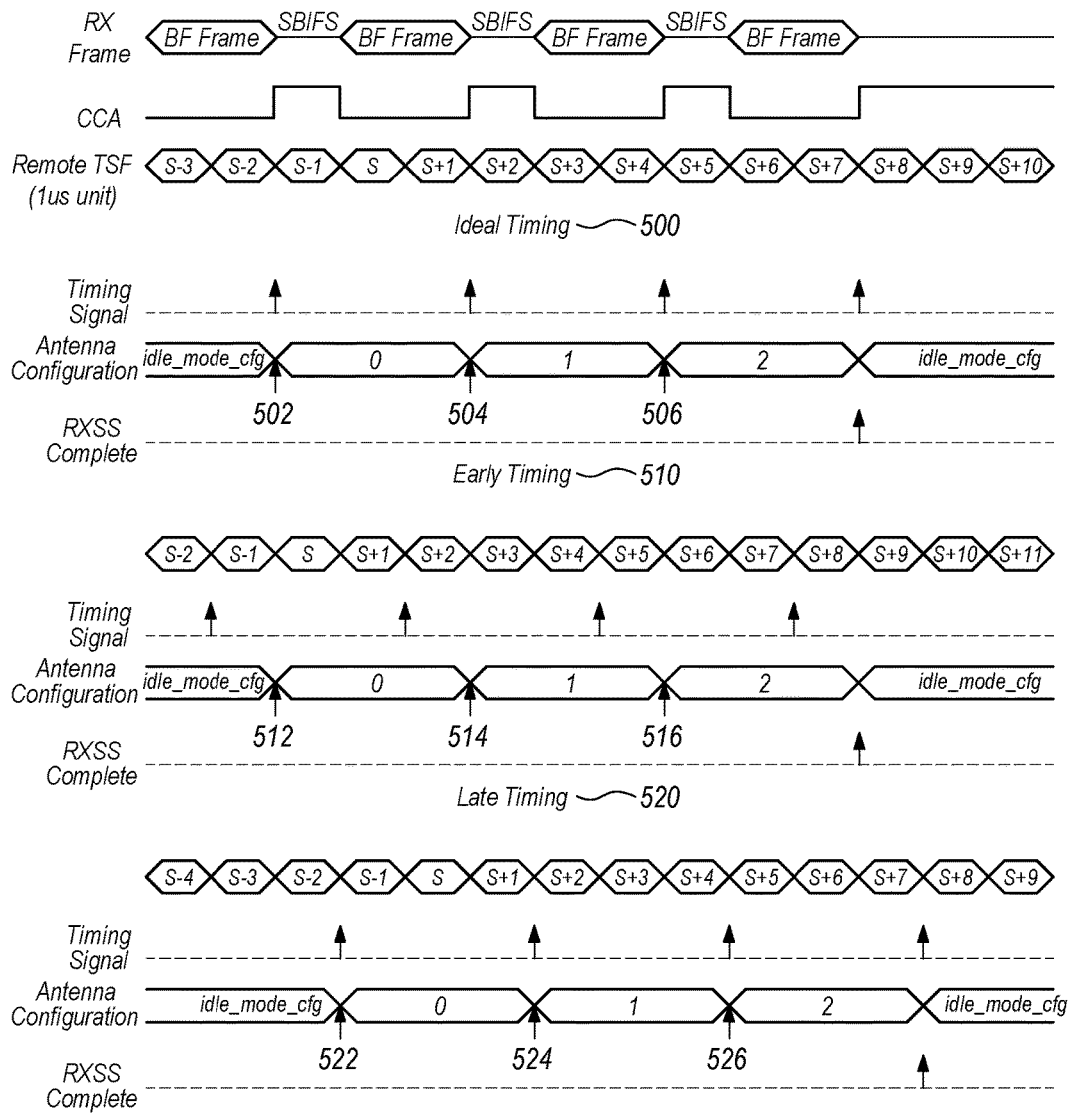
FIG. 5 is a timing diagram depicting example switch times for antenna configuration changes during a receive sector sweep operation.

FIG. 5 is a timing diagram depicting example antenna configuration switches during an RXSS operation. In the diagram, the RXSS frames begin on the 1 us timestep depicted as S. The TSF at the top of the diagram refers to the TSF at the remote station. The RXSS frames are synchronized to this TSF as the remote station is transmitting in this scenario. The diagram depicts a nominal timing scenario (ideal timing diagram 500) and two extreme timing scenarios (early timing diagram 510 and late timing diagram 520). In ideal timing diagram 500, local TSF timer 132 is perfectly synchronized to the remote TSF counter. The timing signal triggers 1 us before the designated switch time, which is exactly the moment the previous frame completes. Since the CCA indicates a clear channel, SLS controller 116 may switch directly to the first configuration at time 502 when the air becomes free based entirely on the timing signal assertion. This process repeats as the timing signal triggers as each BF frame completes. Thus, the antenna configuration is changed at both times 504 and 506.

Timing diagram 510 indicates early timing, where local TSF timer 132 is up to 1 us ahead of the remote TSF timer. In this case, the timing signal for triggering a configuration change is early. SLS controller 116 is prevented from switching antenna configurations immediately when receiving the timing signal as that would corrupt the currently received frame. Therefore, SLS controller 116 monitors CCA, received from RF transceiver module 140, to ensure that the channel is clear before switching configurations. Thus, the antenna configurations change at times 512, 514, and 516, after the timing signal triggers in response to the CCA assertion. If a frame is expected but not being heard, then there is no danger in switching CCA early.

Timing diagram 520 indicates late timing, where the local TSF counter is up to 1 us behind the TSF of the remote station. In this scenario, SLS controller 116 still sees CCA asserted and switches the antenna configuration when the timing signal asserts. Since the RXSS frames are separated by SBIFS, this provides sufficient time such that SLS controller 116 sets the antenna configuration before the frame is on air. The antenna configurations are thus changed at times 522, 524, and 526. The RXSS complete signal indicates the end of an RXSS operation. When this signal asserts, SLS controller 116 stops changing antenna configurations.

VI. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
    a local timing synchronization function (TSF) timer that is operative to synchronize with a remote TSF timer and to indicate synchronized switch times during which the apparatus switches a configuration of a set of one or more antennas during a receive SLS operation;

a timing source that is operative to determine a synchronized switch time based on the local TSF timer, and to output a timing signal at a predetermined time that is earlier than the synchronized switch time;

a lookup table for storing a set of antenna configuration entries;

a sector-level sweep (SLS) controller that is communicatively coupled with the lookup table and that is operative to read an antenna configuration entry from the set of antenna configuration entries stored in the lookup table and output control signals to configure the set of one or more antennas at the predetermined time based on the antenna configuration entry;

wherein the SLS controller is operative to periodically switch between different antenna configuration entries in the set of antenna configuration entries stored in the lookup table and switch the configuration of the set of one or more antennas during the receive SLS operation.

2. The apparatus of claim 1, wherein the SLS controller is operative to perform one or more of:

switch between the different antenna configuration entries in response to a signal from a timing source without communicating with a processor, switch between different antenna configuration entries stored in the lookup table by sequentially reading a next entry from the set of antenna configuration entries stored in the lookup table and outputting corresponding control signals to change the configuration of the set of one or more antennas, switch to a new antenna configuration entry after a first frame has been transmitted during a sector level sweep and before the next frame is transmitted during the sector level sweep, or switch between the different antenna configuration entries stored in the lookup table during a transmit sector sweep operation.

3. The apparatus of claim 1, wherein the lookup table is a first lookup table and the set of antenna configuration entries are for a transmit SLS operation, wherein the apparatus further comprises a second lookup table that stores a second set of antenna configuration entries for the receive SLS operation.

4. The apparatus of claim 1, wherein the predetermined time is one microsecond earlier than the synchronized switch time indicated by the local TSF timer.

5. The apparatus of claim 1, wherein the SLS controller is operative to wait to switch the configuration of the set of one or more antennas after receiving the timing signal from the timing source until a clear channel assessment value indicates that a channel over which beamforming (BF) frames are being received is clear.

6. The apparatus of claim 1, wherein switching between different antenna configuration entries causes a change in a direction associated with transmitting or receiving a signal through the set of one or more antennas.

7. The apparatus of claim 1, wherein each antenna configuration entry is an antenna weighted vector that defines a phase and a gain for each antenna in the set of one or more antennas.

8. The apparatus of claim 1, wherein the set of antenna configuration entries stored by the lookup table is programmable by software.

9. The apparatus of claim 1, wherein the set of one or more antennas is configured to operate in the 60GHz frequency band.

10. A method comprising:

synchronizing, on a first device, a local timing synchronization function (TSF) timer with a remote timing synchronization on a second device;

determining, based on the local TSF timer on the first device, a designated switch time for switching an antenna configuration on the first device during a receive sector sweep operation;

wherein the first device receives a sequence of frames from the second device over a particular channel during the receive sector sweep operation;

switching the antenna configuration of the first device before the designated switch time when a clear channel assessment indicates that the particular channel is clear.

11. The method of claim 10, wherein the antenna configuration of the first device is switched up to one microsecond before the designated switch time.

12. The method of claim 10, wherein the designated switch time is one switch time from a set of designated switch times for the receive sweep operation, the method further comprising periodically generating a timing signal one microsecond before designated switch times; wherein the first device periodically switches antenna configurations based on the timing signal and the clear channel assessment.

13. The method of claim 12, further comprising incrementally reading the antenna configurations from a lookup table.

14. The method of claim 10, wherein switching the antenna configuration of the first device before the designated switch time when a clear channel assessment indicates that the particular channel is clear comprises: in response to receiving a timing signal before the designated switch time, checking whether the clear channel assessment indicates that channel clarity satisfies a threshold; if the clear channel assessment indicates that the channel clarity satisfies the threshold, switching the antenna configuration of the first device; if the clear channel assessment does not satisfy the threshold, waiting to switch the antenna configuration of the first device until the clear channel assessment indicates that channel clarity satisfies the threshold.

15. The method of claim 10, further comprising selecting a particular antenna configuration for receiving transmissions from the second device over the particular channel; wherein the particular channel is in the 60 GHZ frequency band.

16. An apparatus comprising:

a local timing synchronization function (TSF) timer that is operative to synchronize with a remote TSF timer on a second device, and to determine a designated switch time for switching an antenna configuration of the apparatus during a receive sector-level sweep (SLS) operation;

wherein the apparatus receives a sequence of frames from the second device over a particular channel during the receive SLS operation; and an SLS controller that is configured to cause the antenna configuration of the apparatus to be switched before the designated switch time when a clear channel assessment indicates that the particular channel is clear.

17. The apparatus of claim 16, wherein the antenna configuration of the apparatus is switched up to one microsecond before the designated switch time.

18. The apparatus of claim 16, wherein:

the designated switch time is one switch time from a set of designated switch times for the receive SLS operation, the apparatus further comprises a timing source that is operative to generate a timing signal at a predetermined time before each designated switch time, and the SLS controller is further configured to cause the antenna configuration of the apparatus to be switched based upon both the timing signal and the clear channel assessment indicating that the particular channel is clear.

19. The apparatus of claim 18, wherein the SLS controller is further configured to read a new antenna configuration to which the apparatus is switched from a lookup table.

20. The apparatus of claim 16, wherein the SLS controller is configured to cause the antenna configuration of the apparatus to be switched when the clear channel assessment indicates that the particular channel is clear by:

determining whether the clear channel assessment indicates that channel clarity satisfies a threshold, if the clear channel assessment indicates that the channel clarity satisfies the threshold, the causing the antenna configuration of the apparatus to be switched, and if the clear channel assessment does not satisfy the threshold, then waiting to cause the antenna configuration of the apparatus to be switched until the clear channel assessment indicates that channel clarity satisfies the threshold.

21. The apparatus of claim 16, wherein:

the SLS controller is further configured to select a particular antenna configuration for receiving transmissions from the second device over the particular channel, and the particular channel is in the 60 GHZ frequency band.

* * * * *